United States Patent
Tamura et al.

(10) Patent No.: US 10,527,719 B2
(45) Date of Patent: Jan. 7, 2020

(54) OBJECT DETECTION APPARATUS AND OBJECT DETECTION METHOD

(71) Applicant: DENSO CORPORATION, Kariya, Aichi-pref. (JP)

(72) Inventors: Kei Tamura, Kariya (JP); Yosuke Ito, Kariya (JP); Akitoshi Minemura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 79 days.

(21) Appl. No.: 15/575,314

(22) PCT Filed: May 19, 2016

(86) PCT No.: PCT/JP2016/064895
§ 371 (c)(1),
(2) Date: Nov. 17, 2017

(87) PCT Pub. No.: WO2016/186171
PCT Pub. Date: Nov. 24, 2016

(65) Prior Publication Data
US 2018/0149740 A1   May 31, 2018

(30) Foreign Application Priority Data
May 19, 2015   (JP) .................. 2015-101571

(51) Int. Cl.
*G01S 13/86*   (2006.01)
*G06T 7/70*    (2017.01)
(Continued)

(52) U.S. Cl.
CPC .......... *G01S 13/867* (2013.01); *G01S 13/86* (2013.01); *G01S 13/931* (2013.01);
(Continued)

(58) Field of Classification Search
CPC ........ G01S 13/86; G01S 13/931; G01S 13/70; G01S 13/867; G01S 2013/9346;
(Continued)

(56) References Cited

U.S. PATENT DOCUMENTS 6,405,128 B1 *   6/2002   Bechtolsheim .... G01C 21/3667
                                                    340/988
8,610,620 B2 *  12/2013   Katoh .................... G01S 13/931
                                                    342/52
(Continued)

FOREIGN PATENT DOCUMENTS

JP   2011-039833 A   2/2011
JP   2011-248532 A   8/2011
(Continued)

OTHER PUBLICATIONS

International Search Report for PCT/JP2016/064895, dated Aug. 23, 2016. (Year: 2016).*
(Continued)

*Primary Examiner* — Brenda C Bernardi
(74) *Attorney, Agent, or Firm* — Knobbe, Martens, Olson & Bear, LLP

(57) ABSTRACT

An object detection apparatus includes a fusion target generation section that generates a fusion target by combining first target information, which is acquired as a reflected wave of a carrier wave, of an object present ahead of an own vehicle and second target information, which is acquired by image processing by an imaging unit, of the object present ahead of the own vehicle, and that detects the object by using the fusion target. The apparatus includes a first lateral position acquisition means that acquires a first lateral position indicating a position of the object with respect to a width direction of the own vehicle by using the fusion target, a second lateral position acquisition means that acquires a second lateral position indicating a position of the object
(Continued)

with respect to the width direction of the own vehicle by using the second target information, and a lateral position selection means that selects, as a lateral position of the object, the lateral position closest to the own vehicle between the first lateral position and the second lateral position.

11 Claims, 5 Drawing Sheets

(51) Int. Cl.
*G06K 9/00* (2006.01)
*G06K 9/62* (2006.01)
*G08G 1/16* (2006.01)
*G01S 13/93* (2006.01)

(52) U.S. Cl.
CPC ....... *G06K 9/00805* (2013.01); *G06K 9/6289* (2013.01); *G06T 7/70* (2017.01); *G08G 1/166* (2013.01); *G01S 2013/9346* (2013.01); *G01S 2013/9353* (2013.01); *G01S 2013/9375* (2013.01); *G06T 2207/10016* (2013.01); *G06T 2207/10044* (2013.01); *G06T 2207/30261* (2013.01)

(58) Field of Classification Search
CPC .... G01S 2013/9353; G01S 2013/9375; G06K 9/6289; G06K 9/00805; G08G 1/166; G06T 2207/30261; G06T 2207/10044; G06T 2207/10016
See application file for complete search history.

(56) References Cited

U.S. PATENT DOCUMENTS

| | | | |
|---|---|---|---|
| 8,704,887 B2* | 4/2014 | Zeng | G01S 13/726 348/135 |
| 2014/0139369 A1* | 5/2014 | Baba | G01S 13/867 342/146 |
| 2017/0294123 A1 | 10/2017 | Takahiro | |

FOREIGN PATENT DOCUMENTS

| | | |
|---|---|---|
| JP | 2014-06123 A | 1/2014 |
| JP | 2016-066180 A | 4/2016 |

OTHER PUBLICATIONS

Written Opinion of the International Searching Authority for PCT/JP2016/064895, dated Aug. 23, 2016. (Year: 2016).*

* cited by examiner

OBJECT DETECTION APPARATUS AND OBJECT DETECTION METHOD

TECHNICAL FIELD

The present invention relates to an object detection apparatus that detects an object by using a radar and an imaging unit, and an object detection method.

BACKGROUND ART

Safety systems for avoiding a collision or reducing damage due to a collision, such as a PCS (Pre-crash safety system), have been developed. To appropriately operate the safety system, it is required to accurately obtain a distance between an own vehicle and an object (a vehicle other than the own vehicle, an obstacle, a pedestrian, or the like), a lateral position indicating a position of the object in the width direction of the own vehicle, the size of the object, or the like.

As a technique for covering the above requirements, an object detection apparatus is known which detects an object by using a radar and an imaging unit. Since the radar detects, as a radar target, an object to be detected as a reflection point of electromagnetic waves, the radar can accurately detect a distance to the object. However, it may be difficult for the radar to correctly specify the size or a lateral position of the object. Since the imaging unit extracts an object as an image target by image processing for a picked up image, the imaging unit can accurately detect the size or a lateral position of the object. However, it may be difficult for the imaging unit to correctly specify the distance to the object.

Hence, in Patent Literature 1, a radar target captured by a radar and an image target captured by an imaging unit are compared with each other. If it is determined that the radar target and the image target are captured from the same object, the radar target and the picked up target are combined (fusion) to create a new target (fusion target). It is noted that the distance to the fusion target is set based on the detection distance to the radar target, and the lateral position of the fusion target is generated by combining both information on the radar target and the image target. Hence, using the fusion target can improve a capability of detecting an object of an object detection apparatus. (Refer to Patent Literature 1)

CITATION LIST

Patent Literature

Patent Literature 1 JP-A-2011-39833

SUMMARY OF THE INVENTION

Technical Problem

Meanwhile, to appropriately operate a safety system, it is required to correctly recognize an approach state between the own vehicle and an object. However, it has been found that the lateral position of the object recognized from the fusion target does not necessarily agree with an end portion of the object detected from an image acquired by the imaging unit.

Solution to Problem

An embodiment provides an object detection apparatus and an object detection method that can improve accuracy in detecting an object.

An object detection apparatus of an embodiment includes a fusion target generation section that generates a fusion target by combining first target information, which is acquired as a reflected wave of a carrier wave, of an object present ahead of an own vehicle and second target information, which is acquired by image processing by an imaging unit, of the object present ahead of the own vehicle, and that detects the object by using the fusion target. The apparatus includes: a first lateral position acquisition means that acquires a first lateral position indicating a position of the object with respect to a width direction of the own vehicle by using the fusion target; a second lateral position acquisition means that acquires a second lateral position indicating a position of the object with respect to the width direction of the own vehicle by using the second target information; and a lateral position selection means that selects, as a lateral position of the object, the lateral position closest to the own vehicle between the first lateral position and the second lateral position.

DESCRIPTION OF THE EMBODIMENTS

Figure 1:
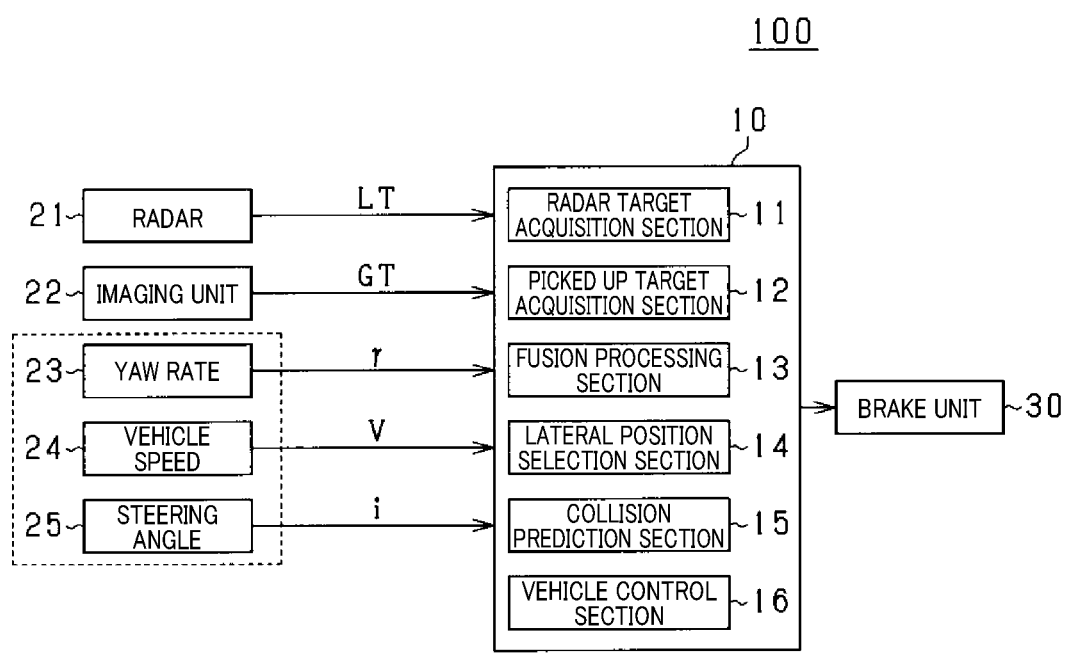
FIG. 1 is a schematic block diagram of an object detection apparatus.

Hereinafter, embodiments are described with reference to the drawings. It is noted that, in the flowing embodiments, the same or equivalent parts share the same reference signs in the drawings, and the same description applies to the part denoted by the same reference sign.

An object detection apparatus according to the present embodiment is installed in a vehicle (own vehicle) and functions as a PCS system that detects an object present ahead of the own vehicle and performs control to avoid a collision or mitigate collision with the object.

In FIG. 1, an object detection apparatus 100 installed in an own vehicle includes an ECU 10, a radar 21, an imaging unit 22, various sensors, and a brake unit 30.

Figure 2:
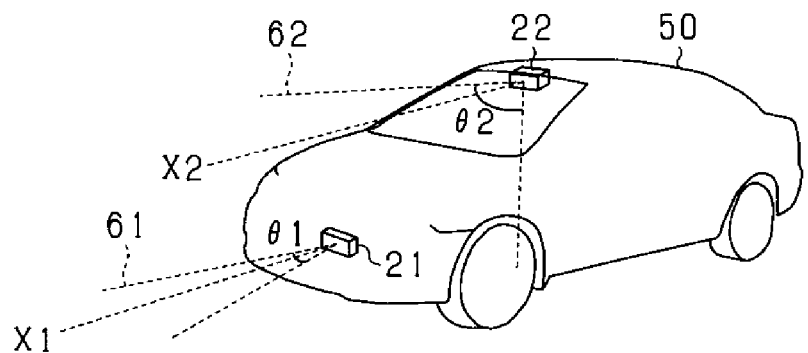
FIG. 2 is a diagram showing an installation state of an imaging unit and a radar in an own vehicle.

The radar 21 detects an object present ahead of the own vehicle as a radar target LT by using electromagnetic waves having directivity such as millimeter waves and radar waves. As shown in FIG. 2, the radar 21 is mounted on the anterior part of the own vehicle 50 so as to an optical axis X1 thereof is directed ahead of the vehicle. The radar 21 scans an area 61, which spreads throughout the range at a predetermined angle θ1 centering on the optical axis X1 and ahead of the vehicle, with a radar signal. In addition, the radar 21 receives electromagnetic waves reflected from a surface of an object present outside the vehicle and outputs the electromagnetic waves to the ECU 10.

It is noted that, in the radar 21, when a reflected wave of a radar wave (carrier wave) is received with reception intensity equal to or more than a predetermined value, it is assumed that an object is detected. Hence, every time when the radar 21 receives a reflected wave with intensity equal to or more than the predetermined value, the radar 21 assumes that one radar target LT is received and outputs the radar target LT to the ECU 10.

The radar target LT includes information such as a distance to the object in the traveling direction of the own vehicle and a relative speed between the own vehicle and the object, and a lateral position representing a position in the width direction of the own vehicle. It is noted that although the radar 21 can accurately detect a distance to the object in the traveling direction of the own vehicle and a relative speed between the own vehicle and the object, the radar 21 has a feature that accuracy in detecting a lateral position of an object is relatively low.

The imaging unit 22 is, for example, a CCD camera, a monocular camera, and a stereo camera, and is placed, for example, in the vicinity of the top edge of the front windshield of the own vehicle 50 as shown in FIG. 2. That is, the imaging unit 22 is mounted at a position in the front-back direction with respect to the position where the radar 21 is mounted. The imaging unit 22 acquires an image by picking up an image of an area 62 spreading in the range at a predetermined angle θ2 centering on the optical axis X2 and ahead of the vehicle. Then, the imaging unit 22 processes the picked up image to acquire an object as an image target GT, and outputs the image target GT to the ECU 10.

The image target GT includes information such as a distance to the object in the traveling direction of the own vehicle and a relative speed between the own vehicle and the object, in addition to a lateral position representing a position in the width direction of the vehicle. Hence, the ECU 10 recognizes the image target GT as information having a predetermined width. It is noted that although the imaging unit 22 has relatively low accuracy in detecting a distance from the own vehicle in the traveling direction and a relative speed, the imaging unit 22 has a feature that accuracy in detecting a lateral position, a width, and the like of the object is high.

As the various sensors, a yaw rate sensor 23, a vehicle speed sensor 24, a steering angle sensor 25 are provided. The yaw rate sensor 23 is a well-known sensor that detects a turning angle speed (yaw rate γ) of the vehicle. The vehicle speed sensor 24 detects a speed of the own vehicle (own vehicle speed V) based on a rotation speed of wheels. The steering angle sensor 25 detects an angle, at which the steering wheel of the own vehicle is rotated, as a steering angle.

The ECU 10 is an electronic control unit that controls the whole object detection apparatus 100. The ECU 10 is configured by a CPU as a main part and includes a ROM, a RAM, an I/O, and the like. The ECU 10 detects objects other than the own vehicle (a vehicle other than the own vehicle, an obstacle, a pedestrian, or the like) based on information on targets acquired by the radar 21 and the imaging unit 22. Then, the ECU 10 determines whether or not the own vehicle is likely to collide with the objects. If determining that the probability of a collision is high, the ECU 10 operates the brake unit 30. It is noted, as the brake unit 30, a loudspeaker, seat belts, a brake, and the like are provided. For example, if determining that the probability of a collision between the own vehicle and an object is high, the ECU 10 performs control such as operating the loudspeaker to give an alarm to the driver, tensioning the seat belts, and operating the brake to reduce the collision speed.

The ECU 10 includes a radar target acquisition section 11, a picked up target acquisition section 12, a fusion processing section 13, a lateral position selection section 14, a collision prediction section 15, and a vehicle control section 16.

The radar target acquisition section 11 acquires information on the radar target LT detected by the radar 21 at predetermined intervals. The picked up target acquisition section 12 acquires information on the image target GT detected by the imaging unit 22 at predetermined intervals.

Figure 3:
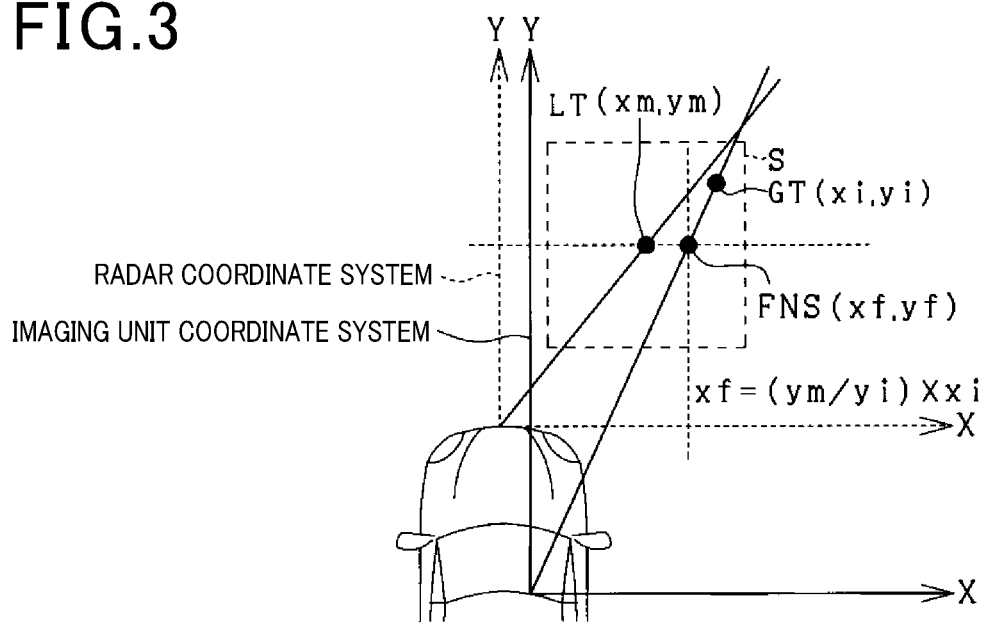
FIG. 3 is a diagram illustrating the principle of calculating a fusion target.

The fusion processing section 13 repeats a target search process and a fusion target generation process at predetermined intervals to generate a fusion target FNS. With reference to FIG. 3, the generation of the fusion target FNS is described in detail. In FIG. 3, the coordinate system of the imaging unit 22 is indicated by solid lines, and the coordinate system of the radar 21 is indicated by broken lines. In addition, in the coordinate systems, the width direction of the own vehicle is defined as an X axis, and the traveling direction of the own vehicle orthogonal to the width direction is defined as a Y axis.

First, in the target search process, when the radar target acquisition section 11 has acquired the radar target LT, the fusion processing section 13 determines whether or not there is the image target GT included in a search range S centering on the radar target LT (xm, ym). If there is the image target GT included in the search range S, it is determined that the image target GT and the radar target LT have a similarity therebetween and are the same object. In the example shown in FIG. 3, it is determined that the image target GT (xi, yi) and the radar target LT (xm, ym) are the same object.

In this case, in the fusion target generation process, the fusion processing section 13 integrates the radar target LT (xm, ym) and the image target GT (xi, yi), which are determined as the same object, and generates a fusion target FNS (xf, yf).

Specifically, the fusion processing section 13 sets the intersection of a line connecting the image target GT (xi, yi) and the origin of the own vehicle (the origin of the coordinate system of the imaging unit 22) and a line extending in the x axis direction from the radar target LT (xm, ym), to the coordinate (position) of the fusion target FNS (xf, yf). That is, for the fusion target FNS, the position in the x axis direction is set to xf=(ym/yi) xi, and the position in the y axis direction is set to yf=ym.

As described above, when the position yf of the fusion target FNS in the travelling direction of the own vehicle is set to the distance ym to the radar target LT, and the position xf of the fusion target FNS in the width direction is set with reference to the position xi of the image target GT in the width direction, the position of the object is specified by the specific information of the radar 21 and the imaging unit 22, whereby accuracy in recognizing the position of the object can be improved.

However, it has been understood that the lateral position of the fusion target FNS set by integrating the lateral positions of the radar target LT and the image target GT is output as a position farther from the own vehicle or closer to the own vehicle than the lateral position of a target detected by image processing of an image acquired by the imaging unit 22.

Hence, according to the present embodiment, the lateral position selection section 14 compares the lateral position of the fusion target FNS (FNS lateral position Y1), and the lateral position of the left end (left lateral position Y2) and the lateral position of the right end (right lateral position Y3) of the image target GT of the same object. Then, the lateral position selection section 14 selects the lateral position closest to the own vehicle among the above lateral positions as a lateral position to be controlled by the PCS (hereinafter, referred to as a PCS lateral position).

Figure 4:
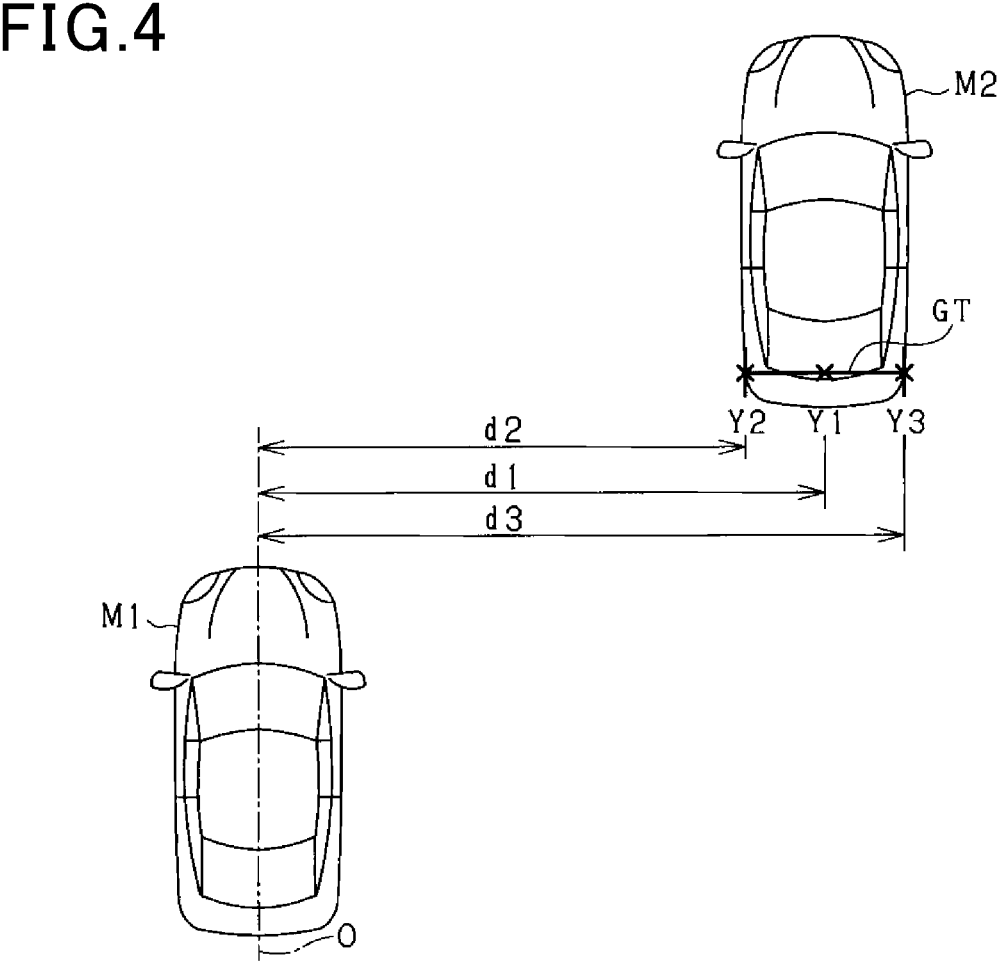
FIG. 4 is a diagram illustrating selection of a lateral position.

Specifically, referring to FIG. 4, when the center position of an own vehicle M1 in the width direction is defined as an axis (own vehicle line O), a distance d1 between the own vehicle line O and an FNS lateral position Y1, a distance d2 between the own vehicle line O and a left lateral position Y2, and a distance d3 between the own vehicle line O and a right lateral position Y3 are compared. In this case, the left lateral position Y2, which is closest to the own vehicle line O, is selected as a PCS lateral position.

Meanwhile, when the own vehicle runs on a curve, the distances between the own vehicle line O and the lateral positions are affected and change. Hence, according to the present embodiment, the lateral position selection section 14 determines an estimated R, which is a curve radius (the reciprocal of a curvature) of a predicted course of the own vehicle. Then, the lateral position selection section 14 corrects the lateral positions by using the estimated R.

Figure 5:
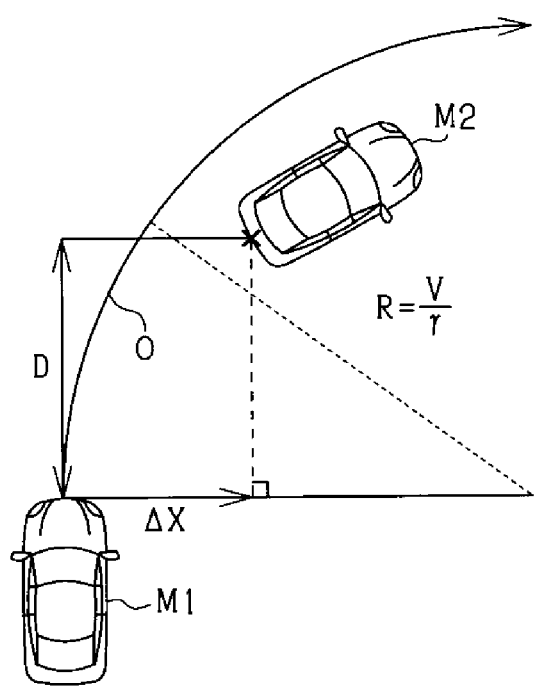
FIG. 5 is a diagram illustrating correction to a lateral position of a target.

Specifically, in FIG. 5, the lateral position selection section 14 calculates the estimated R by R=V/γ, based on own vehicle speed V detected by the vehicle speed sensor 24, and a yaw rate γ detected by the yaw rate sensor 23. Then, the lateral position selection section 14 calculates a correction value Δx of the lateral position by Δx=D·D/2R. Then, the lateral position selection section 14 uses the calculated correction value Δx to correct the lateral positions, that is, the FNS lateral position Y1, the left lateral position Y2, and the right lateral position Y3. Then, the lateral position selection section 14 compares the corrected lateral positions to select the lateral position closest to the own vehicle line O as a PCS lateral position.

It is noted that when the own vehicle is stopped, that is, when the estimated R is zero, or when the own vehicle is running in a straight line, that is, when the estimated R is more than a predetermined threshold value, the correction using the correction value Δx is not performed. Hence, for example, in an area having a large estimated R by which it is presumed the own vehicle is running in a straight line, the influence of a wobble of the driver can be eliminated, thereby improving accuracy in calculating the PCS lateral position.

In addition, when the radar target LT and the image target GT are not combined (fusion), that is, when an object is detected by only one of the radar 21 and the imaging unit 22, the PCS lateral position may be selected based on target information obtained by the radar 21 or the imaging unit 22. Specifically, when only the radar target LT is detected, the lateral position selection section 14 selects the radar lateral position of the radar target LT as the PCS lateral position. When only the image target GT is detected, the lateral position selection section 14 selects, as the PCS lateral position, the left lateral position Y2 or the right lateral position Y3, which is closer to the own vehicle line O, of the image target GT.

Furthermore, even in the case where the fusion target FNS has been generated, if the object is a pedestrian, displacement of the lateral position is difficult to be generated. Hence, when it is determined that the object is a pedestrian, the lateral position selection section 14 selects the FNS lateral position Y1 of the fusion target FNS as the PCS lateral position. It is noted that a reflected wave from a pedestrian generated by reflecting a radar wave from the radar 21 is weaker than a reflected wave from a mobile object formed of metal such as a vehicle. Hence, if reflection intensity of a radar wave from the radar 21 is less than a predetermined value, it can be determined that the object is a pedestrian. Alternatively, features of a pedestrian may be extracted by image processing by the imaging unit 22 to determine whether the object is a pedestrian or not.

Returning to the description of FIG. 1, the collision prediction section 15 uses the lateral position selected by the lateral position selection section 14 to determine whether the own vehicle and the object are likely to collide with each other. If the own vehicle and the object are likely to collide with each other, the vehicle control section 16 outputs a signal for operating the brake unit 30.

Next, the procedure of a process selecting a lateral position of a target according to the present embodiment will be described with reference to FIG. 6. It is noted that the present process is repeatedly performed at predetermined intervals in a state where the ECU 10 operates.

First, the radar target acquisition section 11 and the picked up target acquisition section 12 read information on the radar target LT and the image target GT, respectively (S11). Next, the fusion processing section 13 determines whether or not the radar target LT and the image target GT meet a fusion condition (S12). In the present process, if the image target GT is present in the search range S set in S11, a positive determination is made.

If the radar target LT and the image target GT meet the fusion condition, the fusion processing section 13 integrates the radar target LT and the image target GT to generate the fusion target FNS (S13). Then, the fusion processing section 13 calculates the FNS lateral position Y1 of the fusion target FNS, and the left lateral position Y2 and the right lateral position Y3 of the image target GT (S14).

Next, the fusion processing section 13 determines the estimated R from the yaw rate γ and a detection result of the own vehicle speed V (S15). Next, the fusion processing section 13 determines whether or not a condition of correction using the estimated R is met (S16). In the present process, when the own vehicle is stopped, that is, when the estimated R is zero, or when the own vehicle is running in a straight line, that is, when the estimated R is more than the predetermined threshold value, a negative determination is made. Otherwise, a positive determination is made.

If a negative determination is made in S16, the present process proceeds to S19. If a positive determination is made in S16, the fusion processing section 13 calculates the correction value Δx from the estimated R (S17). Then, the fusion processing section 13 uses the correction value Δx calculated in S17 to correct the FNS lateral position Y1, the left lateral position Y2, and the right lateral position Y3 (S18).

Next, the lateral position selection section 14 determines whether the object specified by the fusion target FNS is a pedestrian or not (S19). In S19, if the lateral position selection section 14 determines that the object is a pedestrian, the lateral position selection section 14 selects the FNS lateral position Y1 of the fusion target FNS as the PCS lateral position (S21).

If a negative determination is made in S19, that is, if the object is other than a pedestrian (e.g. vehicle), the lateral position selection section 14 selects, as the PCS lateral position, the lateral position closest to the own vehicle line O among the FNS lateral position Y1, the left lateral position Y2, and the right lateral position Y3 (S20).

In contrast, if the fusion condition is not met in S12, the lateral position selection section 14 determines whether or not only the radar target LT is detected (S22). If a positive determination is made, the lateral position selection section 14 selects the radar lateral position of the radar target LT as the PCS lateral position (S23). If a negative determination is made in S22, the lateral position selection section 14 determines whether or not only the image target GT is detected (S24). If a positive determination is made, the lateral position selection section 14 selects, as the PCS lateral position, the radar lateral position closer to the own vehicle line O between left lateral position Y2 and the right lateral position Y3 (S25). If a negative determination is made in S24, that is, neither the radar target LT nor the image target GT is detected, the present process ends.

Figure 7:
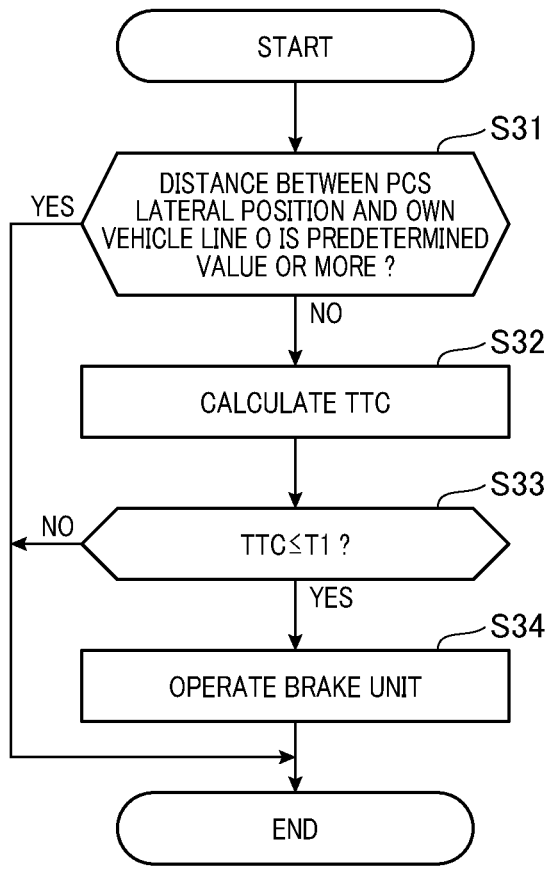
FIG. 7 is a flowchart of a drive assist process.

Next, a drive assist operation process performed by the ECU 10 will be described with reference to the flowchart shown in FIG. 7. It is noted that the present process is repeatedly performed at predetermined intervals in a state where the ECU 10 operates.

First, the collision prediction section 15 determines whether or not the distance between the PCS lateral position and the own vehicle line O is a predetermined value or more (S31). If a positive determination is made in S31, that is when the probability of a collision between the own vehicle and an object is low, the present process ends. If a negative determination is made in S31, that is if the distance between the PCS lateral position and the own vehicle line O is less than the predetermined value, TTC (Time-To-Collision) concerning the present object is calculated by a method of, for example, dividing the distance between the object and the own vehicle by a relative speed of the object (S32).

Next, the vehicle control section 16 compares the TTC with an operation timing T1 of the brake unit 30 (S33). If the TTC is the operation timing T1 or less, it means that the TTC has reached the operation timing T1. Hence, the vehicle control section 16 transmits a drive signal to the brake unit 30 (S34). In contrast, if the TTC is more than the operation timing, the present process ends. In this case, the probability of a collision with the object is low, and the brake unit 30 is not driven.

According to the above embodiment, the following advantageous effects can be provided.

When the radar target LT, which is acquired as a reflected wave of a radar wave, of an object present ahead of the own vehicle and the image target GT, which is acquired by image processing by the imaging unit 22, of the object present ahead of the own vehicle are combined (fusion) to create the fusion target FNS, and the lateral position of the object with respect to the width direction of the own vehicle (FNS lateral position) is determined by using the fusion target FNS, the FNS lateral position may be calculated as a position farther from the own vehicle than the lateral position of the object detected by image processing by the imaging unit. Hence, the lateral positions of the object with respect to the width direction of the own vehicle are calculated from the image target GT acquired by the image processing by imaging unit 22, to select, as a lateral position of the object, the lateral position closest to the own vehicle among the FNS lateral position and the lateral positions acquired from the image target GT. In this case, the lateral position of the object with respect to the own vehicle can be correctly determined.

The left lateral position Y2 corresponding to the left side of the rear end portion of the object and the right lateral position Y3 corresponding to the right side thereof are acquired by image processing by the imaging unit, and the FNS lateral position Y1, the left lateral position Y2, and the right lateral position Y3 are compared to determine the lateral position of the object. Hence, the lateral position closest to the own vehicle can be appropriately selected.

When it can be determined whether the object is present on the right side or left side with respect to the own vehicle, using the determination result can specify the lateral position of the target more simply.

A curvature of a predicted course (estimated curve) of the own vehicle is estimated to correct lateral positions based on the curvature. Hence, accuracy in calculating the lateral position of the object with respect to the own vehicle can be increased.

In a case where the own vehicle runs in a straight line, in which the curvature is larger than a predetermined threshold value, the left lateral position is not corrected. Hence, accuracy in calculating the lateral position can be increased while a load of calculation is reduced.

When the fusion target FNS is not generated because one of the radar target LT and the image target GT is not detected, the lateral position of the acquired target, which is the radar target LT or the image target GT, is selected as a lateral position of the object. Hence, even in a situation in which the fusion target FNS is not generated, the lateral position of the object can be selected.

The present invention is not limited to the above but may be implemented as below. It is noted that, in the following description, the part similar to that in the above description is denoted by the same sign to omit redundant expressions.

In the above, an example is described in which the FNS lateral position Y1 of the fusion target FNS is compared with the left lateral position Y2 and the right lateral position Y3 of the image target GT to select the PCS lateral position. In addition to this, when it can be determined whether the object is present on the right side or the left side with respect to the own vehicle, the PCS lateral position can be specified by comparing the FNS lateral position Y1 with one of the left lateral position Y2 and the right lateral position Y3 of the image target GT.

For example, performing image processing for an image acquired by the imaging unit 22 can determine whether the object is present on the right side or the left side with respect to the own vehicle. From this, when the object is present on the left side with respect to the own vehicle, the FNS lateral position Y1 and the right lateral position Y3 are compared with each other. When the object is present on the right side with respect to the own vehicle, the FNS lateral position Y1 and the left lateral position Y2 are compared with each other. Even in this case, the lateral position closer to the own vehicle O is selected as the PCS lateral position.

In the above, in addition to the FNS lateral position Y1, and left lateral position Y2 and the right lateral position Y3 of the picked up target, the PCS lateral position may be selected by using the radar lateral position of the radar target LT. In this case, considering the lateral position of the radar target LT, accuracy in selecting the lateral position closest to the own vehicle O can be increased.

In the above, when the distance between the own vehicle and the target is less than a predetermined value, the TTC may be the operation timing T1 or less. Hence, when the distance to the target detected by the radar 21 is less than a predetermined threshold value, the PCS lateral position may be selected as described above. It is noted that the threshold value of the distance may be variably set depending on the relative speed between the own vehicle and the object.

Figure 6:
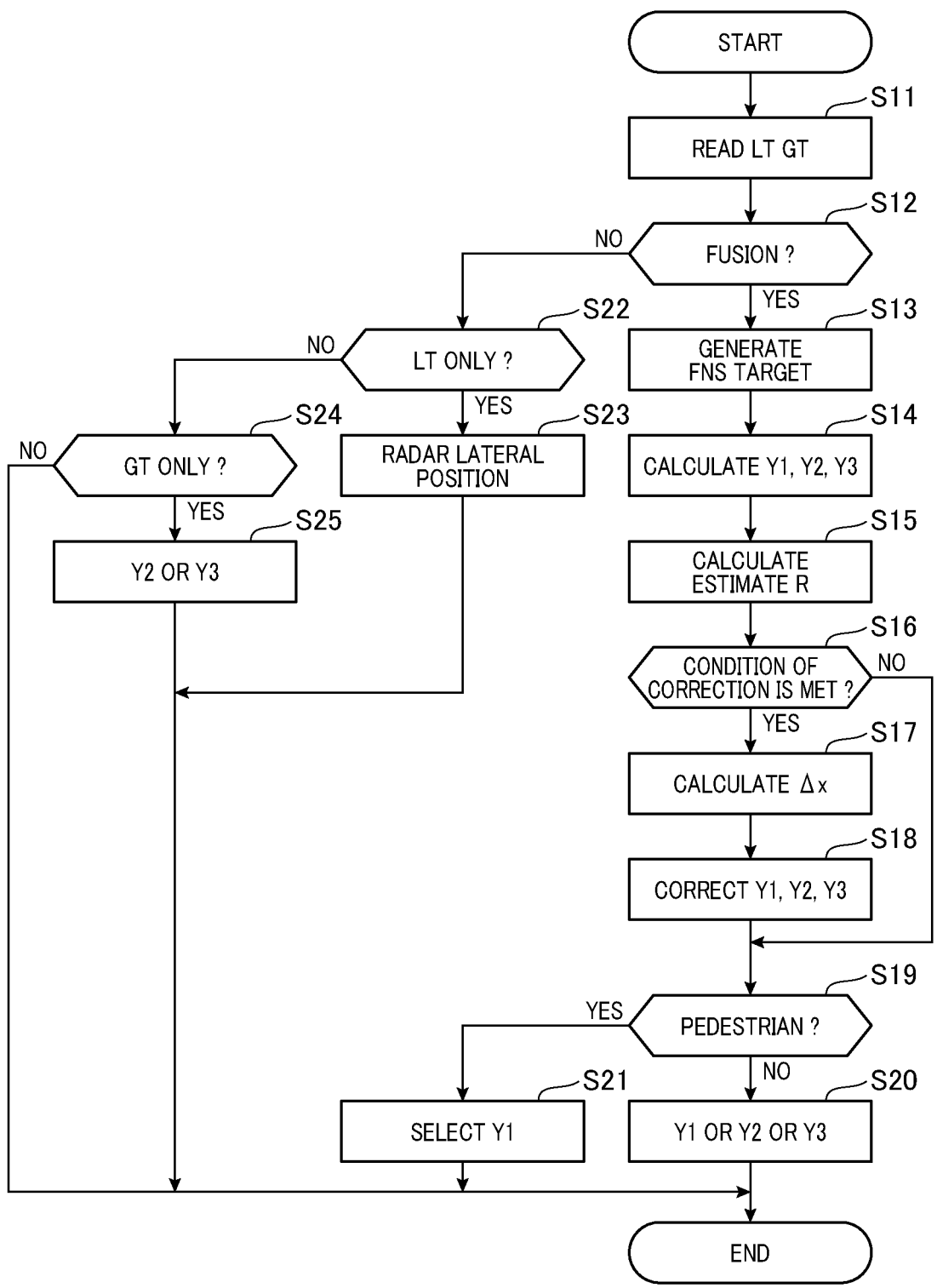
FIG. 6 is a flowchart of a process for selecting a lateral position.

In the above process shown in FIG. 6, the step in which it is determined whether the object is a pedestrian or not may be omitted. That is, regardless of whether the object is a pedestrian or not, the PCS lateral position may be selected by comparing the FNS lateral position Y1, and the left lateral position Y2 and the right lateral position Y3 of the image target GT.

In the above, on condition that the object is determined to be a vehicle having a predetermined width, the above process selecting the lateral position may be performed. It is noted that the object can be determined to be a vehicle having the predetermined width if intensity of a reflected wave received by the radar 21 is a predetermined value or more, and if the width of the object detected by the image processing by the imaging unit 22 or the like is a predetermined value or more.

The object detection apparatus of the embodiment includes a fusion target generation section that generates a fusion target by combining first target information, which is acquired as a reflected wave of a carrier wave, of an object present ahead of an own vehicle and second target information, which is acquired by image processing by an imaging unit (22), of the object present ahead of the own vehicle, and that detects the object by using the fusion target. The apparatus includes: a first lateral position acquisition means that acquires a first lateral position indicating a position of the object with respect to a width direction of the own vehicle by using the fusion target; a second lateral position acquisition means that acquires a second lateral position indicating a position of the object with respect to the width direction of the own vehicle by using the second target information; and a lateral position selection means that selects, as a lateral position of the object, the lateral position closest to the own vehicle between the first lateral position and the second lateral position.

The object detection apparatus of the above embodiment includes a fusion target generation section that generates a fusion target by combining first target information, which is acquired as a reflected wave of a carrier wave, of an object present ahead of an own vehicle and second target information, which is acquired by image processing by an imaging unit (22), of the object present ahead of the own vehicle, and that detects the object by using the fusion target. The apparatus includes: a first lateral position acquisition means that acquires a first lateral position indicating a position of the object with respect to a width direction of the own vehicle by using the fusion target; a second lateral position acquisition means that acquires a second lateral position indicating a position of the object with respect to the width direction of the own vehicle by using the second target information; and a lateral position selection means that selects, as a lateral position of the object, the lateral position closest to the own vehicle between the first lateral position and the second lateral position.

According to the above embodiment, when a fusion target is generated by combining first target information, which is acquired as a reflected wave of a carrier wave, of an object present ahead of the own vehicle and second target information, which is acquired by image processing by the imaging unit, of the object present ahead of the own vehicle, and a lateral position (first lateral position) of the object with respect to the width direction of the own vehicle is determined by using the fusion target, the first lateral position may be calculated as a position farther from the own vehicle than the lateral position of the object detected by the image processing for a picked up image. Hence, the lateral positions (second lateral positions) of the object with respect to the width direction of the own vehicle are calculated from the second target information acquired by the image processing by the imaging unit, to select, as a lateral position of the object, the lateral position closest to the own vehicle among the first lateral position and the second lateral positions. In this case, the lateral position of the object with respect to the own vehicle can be correctly determined.

REFERENCE SIGNS LIST

10: ECU, 21: radar, 22: imaging unit, 100: object detection apparatus

The invention claimed is:

1. An object detection apparatus that includes a fusion target generation section that generates a fusion target by combining first target information, which is acquired as a reflected wave of a carrier wave, of an object present ahead of an own vehicle and second target information, which is acquired by image processing by an imaging unit, of the object present ahead of the own vehicle, and that detects the object by using the fusion target, the apparatus characterized by comprising:
   a first lateral position acquisition means that acquires a first lateral position indicating a position of the object with respect to a width direction of the own vehicle by using the fusion target;
   a second lateral position acquisition means that acquires a second lateral position indicating a position of the object with respect to the width direction of the own vehicle by using the second target information, the second lateral position comprising a left lateral position corresponding to a left side of a rear end portion of the object and a right lateral position corresponding to a right side of the rear end portion of the object; and
   a lateral position selection means that selects, as a lateral position of the object, the lateral position closest to the own vehicle in the width direction of the own vehicle among the first lateral position, the left lateral position and the right lateral position.

2. The object detection apparatus according to claim 1, further comprising a target position determination means that determines whether the object is present on a left side or a right side with respect to the own vehicle, wherein
   the lateral position selection means compares the first lateral position with the left lateral position if the object is present on the right side with respect to the own vehicle and compares the first lateral position with the right lateral position if the object is present on the left side with respect to the own vehicle, to select the lateral position closest to the own vehicle.

3. The object detection apparatus according to claim 1, further comprising an object type determination means that determines a type of the object specified by the fusion target, wherein
   the lateral position selection means selects the first lateral position as a lateral position of the target if the object is determined to be a pedestrian.

4. The object detection apparatus according to claim 1, wherein
   a first acquisition means that acquires the first target information and a second acquisition means that acquires the second target information are provided at different positions in a front-back direction of the own vehicle.

5. The object detection apparatus according to claim 1, further comprising a drive assist determination means that determines whether or not a drive assist for the target is performed, by using the lateral position selected by the lateral position selection means.

6. The object detection apparatus according to claim 1, wherein
a third lateral position of the object with respect to the own vehicle is acquired from the first target information, and
the lateral position selection means selects the lateral position closest to the own vehicle among the first lateral position, the second lateral position, and the third lateral position.

7. The object detection apparatus according to claim 1, further comprising:
a predicted course estimation means that estimates a curvature of a predicted course of the own vehicle; and
a lateral position correction means that corrects the lateral positions acquired by the first and second lateral position acquisition means based on the curvature estimated by the predicted course estimation means.

8. The object detection apparatus according to claim 7, wherein
the lateral position correction means does not correct the lateral position when the own vehicle is running in a straight line, in which a curve radius, which is a reciprocal of the curvature, is more than a predetermined threshold value.

9. The object detection apparatus according to claim 1, wherein
when the fusion target is not generated, the lateral position correction means selects the lateral position acquired by using the first target information or the second target information.

10. An object detection method characterized by comprising:
a step of generating a fusion target by combining first target information acquired as a reflected wave of a carrier wave and second target information acquired by image processing by an imaging unit;
a step of acquiring a first lateral position indicating a position of an object with respect to a width direction of an own vehicle by using the fusion target;
a step of acquiring a second lateral position indicating a position of the object with respect to the width direction of the own vehicle by using the second target information, the second lateral position comprising a left lateral position corresponding to a left side of a rear end portion of the object and a right lateral position corresponding to a right side of the rear end portion of the object; and
a step of selecting, as a lateral position of the object, the lateral position closest to the own vehicle in the width direction of the own vehicle among the first lateral position, the left lateral position and the right lateral position.

11. An object detection apparatus that includes a fusion target generation section that generates a fusion target by combining first target information, which is acquired as a reflected wave of a carrier wave, of an object present ahead of an own vehicle and second target information, which is acquired by image processing by an imaging unit, of the object present ahead of the own vehicle, and that detects the object by using the fusion target, the apparatus characterized by comprising:
a first lateral position acquisition means that acquires a first lateral position indicating a position of the object with respect to a width direction of the own vehicle by using the fusion target;
a second lateral position acquisition means that acquires a second lateral position indicating a position of the object with respect to the width direction of the own vehicle by using the second target information;
a lateral position selection means that selects, as a lateral position of the object, the lateral position closest to the own vehicle between the first lateral position and the second lateral position; and
an object type determination means that determines a type of the object specified by the fusion target, wherein
the lateral position selection means selects the first lateral position as a lateral position of the target if the object is determined to be a pedestrian.

* * * * *